(12) United States Patent
Flinta et al.

(10) Patent No.: US 9,264,403 B2
(45) Date of Patent: Feb. 16, 2016

(54) VIRTUALIZATION PLATFORM

(75) Inventors: Christofer Flinta, Stockholm (SE);
Jan-Erik Mångs, Solna (SE); Bob Melander, Sigtuna (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 712 days.

(21) Appl. No.: 13/122,755

(22) PCT Filed: Oct. 9, 2008

(86) PCT No.: PCT/SE2008/051157
§ 371 (c)(1),
(2), (4) Date: Jul. 29, 2011

(87) PCT Pub. No.: WO2010/041996
PCT Pub. Date: Apr. 15, 2010

(65) Prior Publication Data
US 2011/0292946 A1 Dec. 1, 2011

(51) Int. Cl.
| | |
|---|---|
| H04L 29/06 | (2006.01) |
| H04L 29/12 | (2006.01) |
| G06F 9/455 | (2006.01) |
| H04L 12/46 | (2006.01) |

(52) U.S. Cl.
CPC ............ *H04L 63/0272* (2013.01); *G06F 9/455* (2013.01); *H04L 12/4633* (2013.01); *H04L 61/2015* (2013.01)

(58) Field of Classification Search
None
See application file for complete search history.

(56) References Cited

U.S. PATENT DOCUMENTS

| | | | | |
|---|---|---|---|---|
| 6,948,003 | B1* | 9/2005 | Newman et al. | 709/250 |
| 7,185,106 | B1* | 2/2007 | Moberg et al. | 709/238 |
| 7,448,079 | B2* | 11/2008 | Tremain | 726/14 |
| 7,478,173 | B1* | 1/2009 | Delco | 709/250 |
| 8,213,429 | B2* | 7/2012 | Wray et al. | 370/392 |
| 2007/0064661 | A1* | 3/2007 | Sood et al. | 370/338 |
| 2007/0204166 | A1* | 8/2007 | Tome et al. | 713/182 |
| 2008/0080512 | A1* | 4/2008 | Gofman et al. | 370/392 |
| 2009/0241108 | A1* | 9/2009 | Edwards et al. | 718/1 |

FOREIGN PATENT DOCUMENTS

WO 0203220 A 1/2002

OTHER PUBLICATIONS

Konrad Eriksson, et al.; "From Trusted Platforms to Trusted Virtual Domains"; OpenTC Newsletter Jun. 2008, pp. 8-14; [retrieved from internet Jun. 24, 2013].

(Continued)

*Primary Examiner* — Timothy J Weidner
(74) *Attorney, Agent, or Firm* — Patent Portfolio Builders PLLC

(57) ABSTRACT

The invention relates to a visualization platform (9) arranged to provide at least one virtual operating system instance (9A, . . . , 9N) to at least one remote network (3) over a packet-based communication network (5). The visualization platform is characterized in that it comprises at least one first termination point (4b) of a virtual private network VPN tunnel (10) which enables the establishment of at least one VPN tunnel between said at least one first termination point and at least one second termination point (4a) in said at least one remote network over said packet-based communication network; and in that it is arranged to map said at least one virtual operating system instance to said at least one first termination point of said at least one VPN tunnel. The invention also relates to a method for virtualization and a computer program product.

11 Claims, 4 Drawing Sheets

(56) References Cited

OTHER PUBLICATIONS

Office Action issued in corresponding Japanese Patent Application No. 2011-530983, mailing date Jul. 1, 2013.
Sundararaj, Ananth I. et al, "Towards Virtual Networks for Virtual Machine Grid Computing," USENIX Association, Proceedings of the Third Virtual Machine Research and Technology Symposium, San Jose, CA, USA, May 6-7, 2004, pp. 177-190.
Office Action issued in corresponding Japanese Patent Application No. 2011-530983, mailing date Mar. 1, 2013.
International Search Report for PCT/SE2008/051157 mailed Jun. 22, 2009.
Written Opinion for PCT/SE2008/051157 mailed Jun. 22, 2009.
International Preliminary Report on Patentability for PCT/SE2008/051157 mailed Nov. 10, 2010.
European Communication Pursuant to Article 94(3) EPC dated Nov. 19, 2013, in related European Application No. 08 877 322.1.

* cited by examiner

Fig. 1 - PRIOR ART

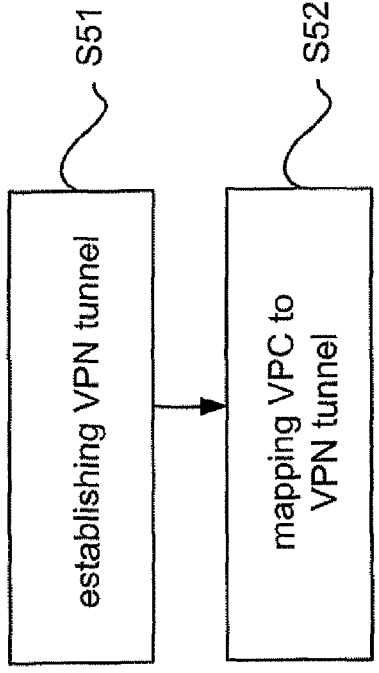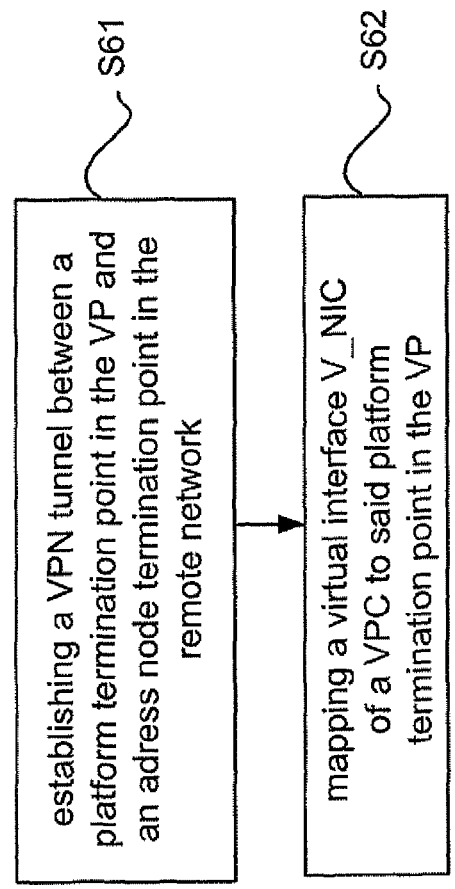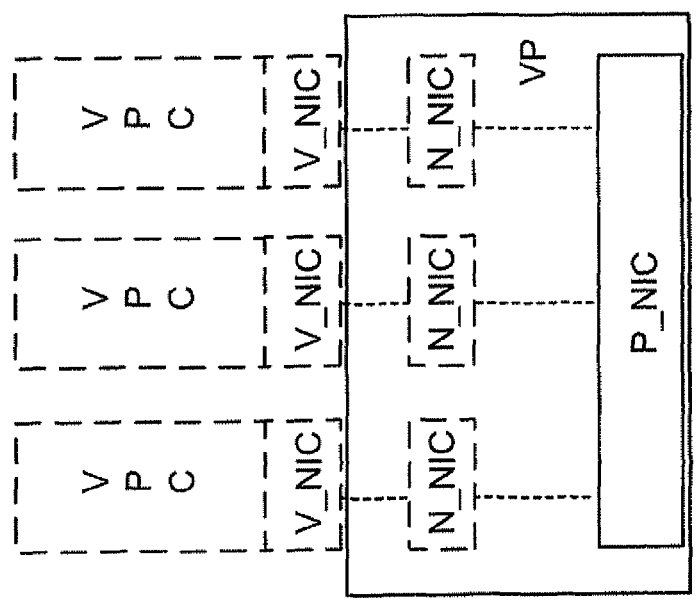

VIRTUALIZATION PLATFORM

TECHNICAL FIELD

The invention relates to virtualization in general and in particular to a virtualization platform and a method for providing virtual operating system instances to remote networks and a computer program product.

BACKGROUND

Today, there are basically two strong trends, outsourcing and virtualization.

Outsourcing may be exemplified by an owner of a remote network leasing a server located in a providing network in order to, for example, minimize computer maintenance costs and the amount of computer hardware that is implemented at the location of the remote network. The remote network may thus be provided with a link to the providing network, which then may be connected to the leased server. The link may be provided over a packet-based communications network, such as, e.g. the Internet. The address domain space of the leased server forms part of the address domain space of the providing network.

Virtualization, as used herein, refers to the provision of virtual operating system instances or virtual machines to remote networks. The provision of virtual operating system instances is generally performed by having the virtual machines running on a virtualization platform in a providing network, which is connected to a packet-based communication network. The remote networks may via the packet-based communication network connect to and execute operations on the designated virtual machine(s) on the virtualization platform.

However, since the virtual machines are part of the providing network, every executed command on the virtual machines that involves transmitting or receiving data traffic to/from another network, such as, for example, a global interconnected communications network (e.g. the internet) or a private network (e.g. an email server in a company network), will be sent from or received at an IP address belonging to the IP address domain space of the providing network. The same applies to the outsourcing case when leasing a server.

This may cause problems for the owner of the providing network if the end users in the remote network use the remote network's designated virtual machine or leased server for unsuitable or illegal purposes, such as, for example, downloading copyrighted material, etc. The owner of the providing network may this way expose the IP address domain space of the providing network to misuse of the virtual machines or leased server by their end users. Thus, the owner of the providing network may be liable for said unsuitable or illegal activities performed by end users in the remote network.

SUMMARY

A problem to which the invention relates is how to provide virtual operating system instances to remote networks in a secure and flexible way.

This problem is addressed by a virtualization platform arranged to provide at least one virtual operating system instance to at least one remote network over a packet-based communication network, characterized in that said virtualization platform comprises at least one first termination point of a virtual private network (VPN) tunnel which enables the establishment of at least one VPN tunnel between said at least one first termination point and at least one second termination point in said at least one remote network over said packet-based communication network, and in that said virtualization platform is arranged to map said at least one virtual operating system instance to said at least one first termination point of said at least one virtual private network VPN tunnel.

The virtualization platform according to the invention as described above enables an arbitrary virtual operating system instance that is executed in the virtualization platform to be connected to an arbitrary remote network, such that the arbitrary virtual operating system instance belongs to the address domain space of the remote network.

Furthermore, the network address domain space of the providing network is never exposed to e.g. possible legal liability for actions caused by misuse of an end user in a remote network. This is because every transmitting or receiving operation executed on the virtual operating system instance in the providing network that exchanges data traffic with other networks, e.g. the internet or private networks, will be addressed using the network address domain space belonging to the remote network. Thus, all legal liability for possible misuse by an end user in a remote network may be transferred to the owner of the remote network leasing the virtual operating system instances.

An advantage of the above described invention is that it enables an end user in a remote network, which uses a virtual operating system instance in a providing network, to transmit or receive data traffic to/from an network address belonging to the network address domain space of the remote network, even though the transmitting or receiving operations are executed on the virtual operating system instance in the providing network.

It is also an advantage of the above described invention that it enables an owner of a remote network to expand the number of network hosts in the remote network without having to purchase an unnecessary amount of expensive computer hardware. Thus, the cost for such a network host expansion may be reduced.

Another advantage of the above described invention is that it gives an owner of a remote network control over the address space of the remote network. This means that the owner may use his own address plan for the remote network even though it contains virtual operating system instances provided by a providing network. It also follows that the remote network is independent from the network address domain space of the providing network, and thus is unaffected by any network address changes performed in the providing network.

A further advantage of the above described invention is that it allows for a simplified and more flexible network host migration in the remote network. For example, when moving a network host in a remote network to a virtual machine in a providing network, it may be desired to keep the network address structure of the remote network intact. This may be desired by the network host due to dependencies on the old network address in the network address structure of the remote network. These dependencies may not function properly if the network host is provided with a new network address. In conventional virtualization systems, this is not possible since the data traffic from the virtual machine in the providing network has a network address comprised in the network address domain space belonging to the providing network. However, according to the invention, the data traffic from the virtual machine in the providing network may be addressed using the existing network address of the network host in the network address structure of the remote network. Thus, the network address of the host will appear unchanged to the remote network, and other networks, after the network host migration.

According to another aspect of the invention the virtualization platform may be arranged so as to have a termination point of the virtual private network tunnel located at an access node shared by several network hosts in the remote network. Furthermore, the virtualization platform may also comprise a virtual switch arranged to receive network traffic for at least two virtual operating system instances, and forward said network traffic to/from the first termination point of the VPN tunnel from/to said at least two virtual operating system instances. These features may enable a setup of only one virtual private network tunnel for multiple network hosts in the remote network, using the virtual operating system instances in the providing network.

This problem is further addressed by a method for use in a virtualization platform arranged to provide at least one virtual operating system instance to at least one remote network over a packet-based communication network, characterized by the step of: mapping at least one virtual operating system instance to at least one first termination point of at least one VPN tunnel, wherein said at least one first termination point enables the establishment of at least one VPN tunnel between said at least one first termination point and at least one second termination point in said at least one remote network over said packet-based communication network.

This problem is further addressed by a computer program product for use in a virtualization platform which comprises computer readable code means, which when run in the virtualization platform causes said virtualization platform to perform the step of: mapping at least one virtual operating system instance to at least one first termination point of at least one VPN tunnel, wherein said at least one first termination point enables the establishment of at least one VPN tunnel between said at least one first termination point and at least one second termination point in said at least one remote network over said packet-based communication network.

Further advantageous embodiments of the virtualization platform, the method and the computer program product are set forth in the dependent claims, which correspondently describe further advantageous embodiments of the invention.

BRIEF DESCRIPTION OF THE DRAWINGS

The invention will be described in more detail in the following with reference to the appended drawings, in which:

FIG. 4 is a detailed block diagram of a virtualization platform according to an exemplary embodiment of the invention.

FIG. 5 is a flowchart illustrating a method for virtualization according to an exemplary embodiment of the invention.

FIG. 6 is a flowchart illustrating a method for virtualization according to another exemplary embodiment of the invention.

DETAILED DESCRIPTION

Figure 1:
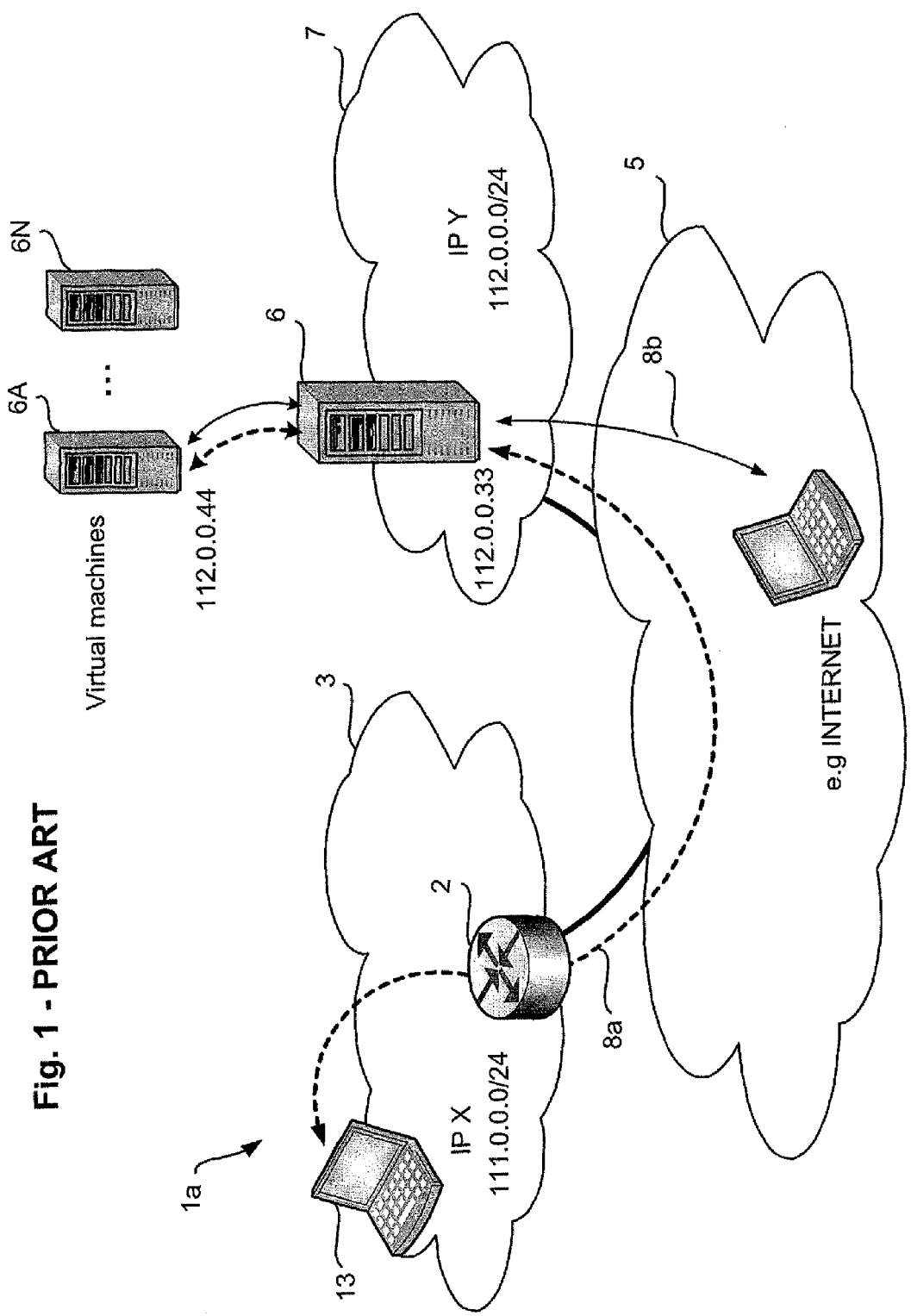
FIG. 1 is a schematic overview of a virtualization network system according to prior art.

In the following, it should be noted that the terms virtual machine, virtual PC (VPC) and virtual operating system instance may be used interchangeably. FIG. 1 schematically illustrates an overview of a virtualization network system 1a according to prior art.

An access node 2 is located in a remote network 3 with the IP address domain space X, 111.0.0.0/24. The remote network 3 is connected to a packet-based communication network 5, such as, for example, the internet, a public/private network or the like. To the packet-based communication network 5 is also connected a virtualization platform 6 located in a providing network 7 with the IP address domain space Y, 112.0.0.0/24. The virtualization platform 6 may be arranged to provide leased virtualized machines 6A, . . . , 6N to the remote network 3 over the packet-based communication network 5.

The remote network 3 can connect to the virtualization platform 6 via the packet-based communication network 5. The access node 2 may then start communicating with the virtualization platform 6 over the connection 8a. The virtualization platform 6 may establish a virtual machine 6A, . . . , 6N for the remote network 3, whereby end users 13 in the remote network 3 can begin executing operations, commands or instructions on the virtual machine 6A, . . . , 6N on the virtualization platform 6 in the providing network 7.

However, every executed operation, command or instruction on the virtual machine 6A, . . . , 6N by an end user 13 in the remote network 3 that involves transmitting or receiving data traffic 8b to/from another network, such as, for example, the internet, a public/private network or the like, will be sent from or received at an IP address belonging to the IP address domain space Y, 112.0.0.0/24, of the providing network 7, for example, the IP address of the leased virtual machine 6A, i.e. 112.0.0.44.

This may be a problem for the owner of the providing network 7 since the owner of the providing network 7 in this way exposes the IP address domain space Y, 112.0.0.0/24, of the providing network 7 to possible misuse by the end users 13 in the remote network 3 using the virtual machine 6A, . . . , 6N. The owner of the providing network 7 may in this way also end up liable for such misuse by the end users 13 in the remote network 3. On the other hand, it may also be of importance, for security and reliability reasons, for the end users 13 in the remote network 3 to appear to be sending data traffic from its own IP address domain space X, 111.0.0.0/24, belonging to the remote network 3, and not from the IP address domain space Y, 112.0.0.0/24, belonging to the providing network 7.

According to the inventive features of the invention, this problem is solved by mapping the virtual machines of the virtualization platform in the providing network onto virtual private network (VPN) tunnels between the providing network and the remote network. In the following it will be shown that by in this way combining virtualization with virtual private network (VPN) technology, the virtual machine will appear as though residing in the remote network, although topologically being anchored in the IP address domain space of the providing network.

Figure 2:
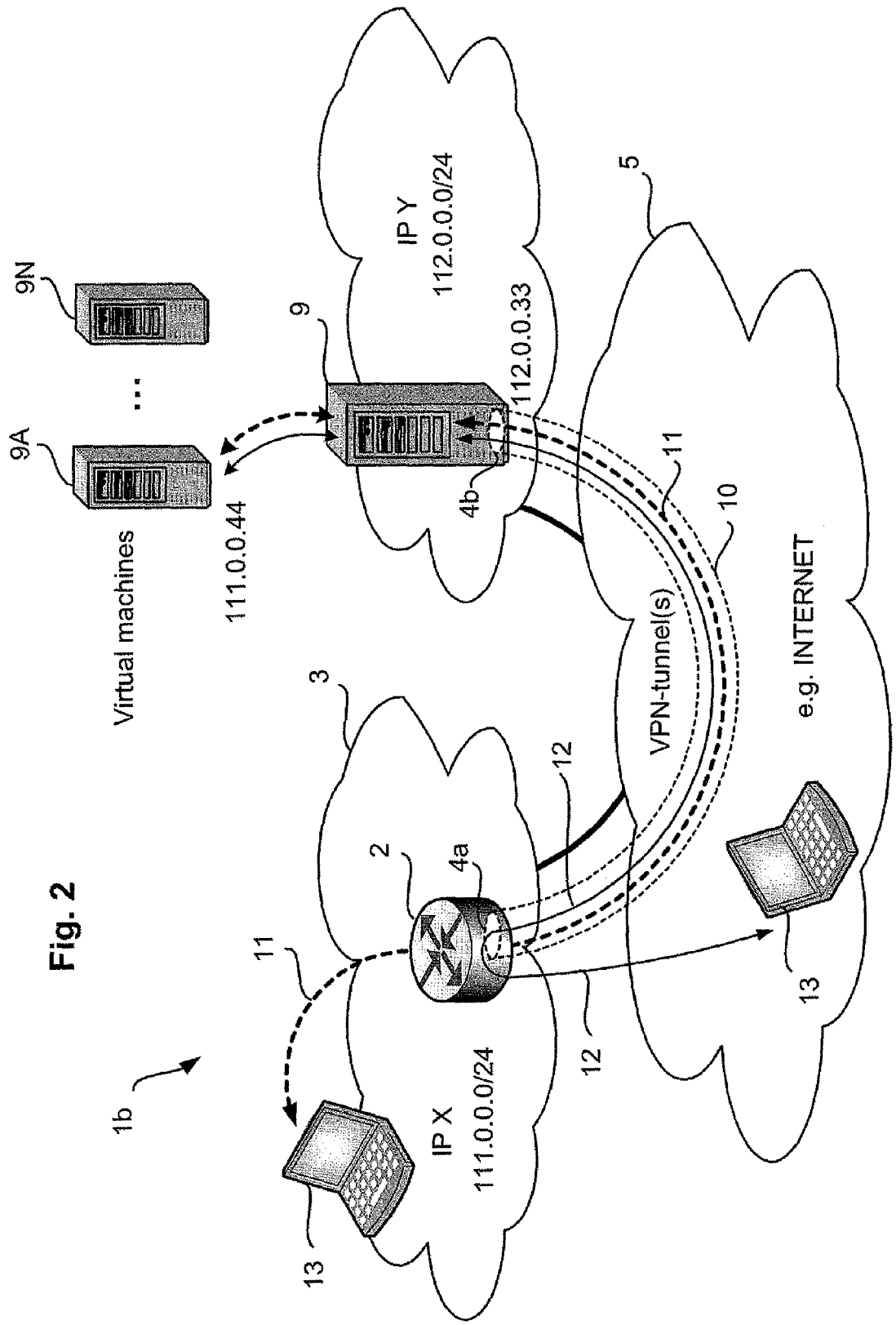
FIG. 2 is a schematic overview of a virtualization network system according to the invention.

FIG. 2 shows a schematic overview of a virtualization network system 1b according to the invention.

An access node 2 is located in a remote network 3 with the IP address domain space X, 111.0.0.0/24. The remote network 3 is connected to a packet-based communication network 5, such as, for example, the internet, a public/private network or the like. The remote network 3 desires to access a leased virtualized machine 9A, . . . , 9N in the virtualization platform 9, which may comprise a server or similar suitable computing equipment, over the packet-based communication network 5. The providing network 7 comprising the virtualization platform 9 is also connected to the packet-based communication network 5.

The remote network 3 may by providing an IP address from the IP address domain space X, 111.0.0.0/24, enable the virtualization platform 9 to establish at least one virtual private network (VPN) tunnel 10 between a termination point 4a in the access node 2 in the remote network 3 and the virtualization platform 9 in the providing network 7. The term virtual private network (VPN) tunnels is used since network data traffic of the link-layer protocols may be said to be tunneled through larger networks, such as, for example, the packet-based communication network 5. The virtual private network (VPN) tunnel 10 may be used for secure communications through the public Internet, and may have means for such explicit security features, such as authentication or content encryption, etc.

The virtualization platform 9 may be arranged to provide another termination point 4b in the virtualization platform 9 for the at least one virtual private network (VPN) tunnel 10. The virtualization platform 9 may also be arranged to map a virtual machine interface to said another termination point 4b, thus connecting the virtual private network (VPN) tunnel 10 with a virtual machine(s) 9A, ..., 9N. This is described in detail with reference to FIGS. 3 and 4 in the following.

The virtualization platform 9 may thus be arranged to provide the virtual machine 9A, ..., 9N to the remote network 3 in the virtualization platform 9 by using the mapping to said another termination point 4b in the virtualization platform 9. The virtual machine(s) 9A, ..., 9N may now be reached from the remote network 3, and from there be provided with the IP address belonging to the IP address domain space X, 111.0.0.0/24, of the remote network 3, for example, 111.0.0.44. Thereby, the virtual machine(s) 9A, ..., 9N in the virtualization platform 9 is accessible from end users 13 within the remote network 3, as well as from end users 13 connected over the packet-based communication network 5, through the access node 2. Also, end users 13 in the remote network 3, or connected over the packet-based communication network 5, may then start to execute operations, commands, instructions or the like of the associated virtual machine 9A, ..., 9N in the virtualization platform 9 through the bi-directional communication 11 (dotted line in FIG. 2) provided by the at least one virtual private network (VPN) tunnel 10.

Network data traffic 11, 12 to an IP address in the remote network 3 or other networks (such as, the Internet, other public/private networks or the like) generated by such operations, commands, instructions or the like, in the associated virtual machine in the virtualization platform 9 will accordingly first be routed to the termination point 4a in the access node 2 in the remote network 3, before being forwarded to its intended destination or IP address, for example, a location in the packet-based communication network 5. Accordingly, the network data traffic 12 will be addressed with an originating IP address 111.0.0.44 belonging to the IP address domain space X, 111.0.0.0/24, of the remote network 3.

Figure 3:
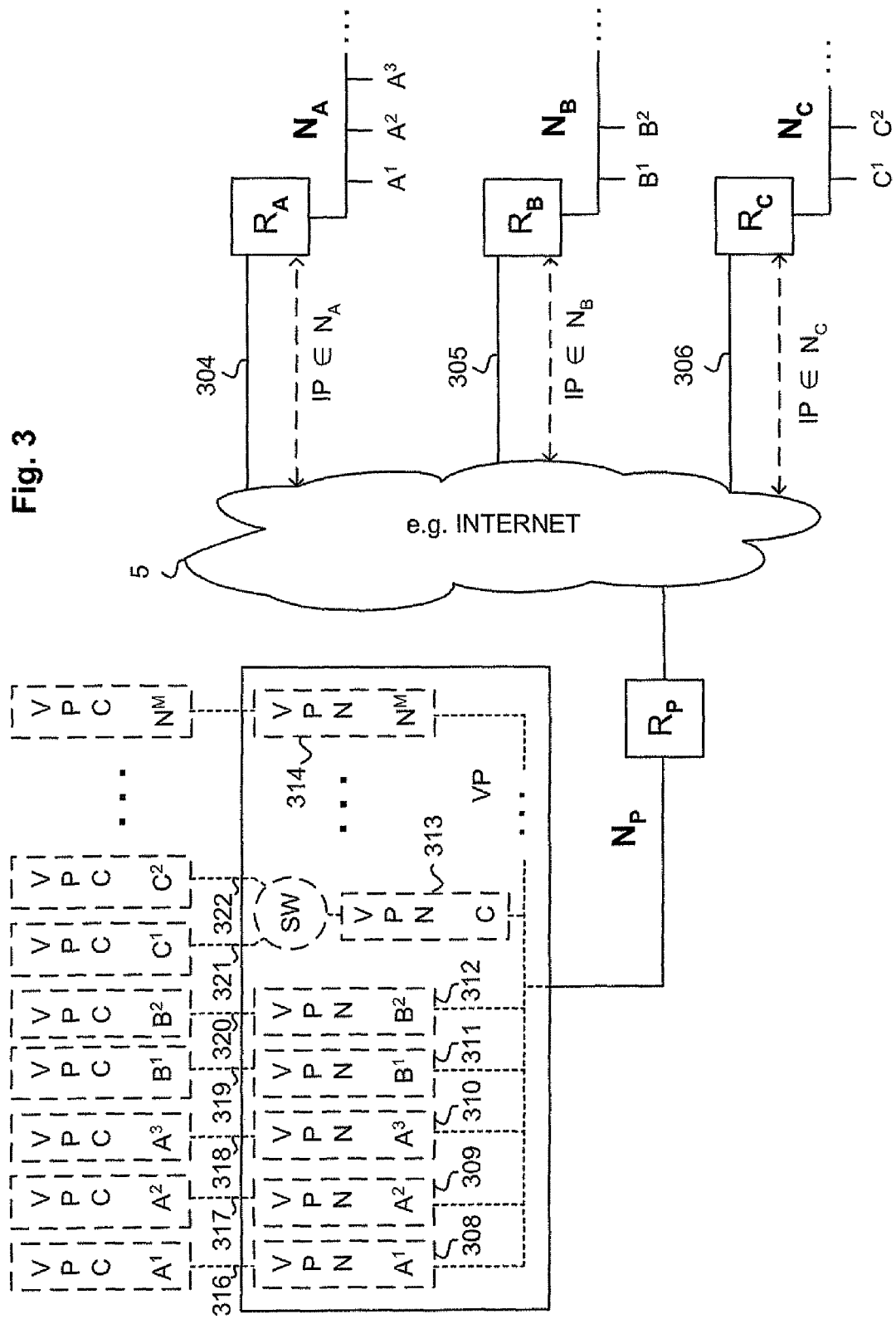
FIG. 3 is a block diagram describing a detailed overview of a virtualization network system comprising a virtualization platform according to an exemplary embodiment of the invention.

FIG. 3 describes a detailed overview of virtualization network system comprising a virtualization platform VP according to an exemplary embodiment of the invention, providing virtual operating system instances VPC $A^1$-$A^3$, $B^1$-$B^2$, $C^1$-$C^2$ to remote networks $N_A$, $N_B$, $N_C$.

In the remote network $N_A$, the designated network addresses $A^1$-$A^3$ indicates a desired position for the virtual operating system instances VPC $A^1$-$A^3$ in address structure of the remote network $N_A$. In the remote network $N_B$, the designated network addresses $B^1$-$B^2$ indicates a desired position for the virtual operating system instances VPC $B^1$-$B^2$ in the address structure of the remote network $N_B$. In the remote network $N_C$, the designated network addresses $C^1$-$C^2$ indicates a desired position for the virtual operating system instances VPC $C^1$-$C^2$ in the remote network $N_C$. The remote networks $N_A$, $N_B$, $N_C$ may further comprise any number of designated network addresses $A^1$-$A^3$, $B^1$-$B^2$, $C^1$-$C^2$ depending on the size of the remote networks $N_A$, $N_B$, $N_C$, or may also comprise only a single designated network address $A^1$-$A^3$, $B^1$-$B^2$, $C^1$-$C^2$.

The remote networks $N_A$, $N_B$, $N_C$ may comprise access nodes $R_A$, $R_B$, $R_C$, respectively, through which connections 304, 305, 306 to a packet-based communication network 5, such as, the Internet, public/private networks or the like, may be established. The access nodes $R_A$, $R_B$, $R_C$ may be, for example, a router, a modem or the like capable of providing network access. Through the connections 304, 305, 306 of the access nodes $R_A$, $R_B$, $R_C$, the remote networks $N_A$, $N_B$, $N_C$ may communicate with an access node $R_P$ in a providing network $N_P$. The providing network $N_P$ comprises the virtualization platform VP. The virtualization platform VP may be arranged to establish virtual private network (VPN) tunnels between platform termination points in the virtualization platform VP and access node termination points in remote networks.

In FIG. 3, the virtualization platform VP comprises platform termination points 308-310, 311-312 of the VPN tunnels VPN $A^1$-$A^3$, $B^1$-$B^2$ for each of the designated network addresses $A^1$-$A^3$, $B^1$-$B^2$ in the remote networks $N_A$, $N_B$, respectively. The access nodes $R_A$, $R_B$ in the remote network $N_A$, $N_B$ may comprise access node termination points of the VPN tunnels VPN $A^1$-$A^3$, $B^1$-$B^2$, respectively. The virtualization platform VP further comprises a platform termination point 313 of the VPN tunnel VPN C for the designated network addresses $C^1$-$C^2$ in the remote network $N_C$. The access node termination point of the VPN tunnel VPN C may be comprised in the access node $R_C$ to the remote network $N_C$. Thus, the VPN tunnel C may be shared by for the designated network addresses $C^1$-$C^2$ in the remote network $N_C$. Further termination points and VPN tunnels for designated network addresses in other remote networks may also be arranged, as indicated by the termination point 314 for the VPN tunnel $N^M$, where N denotes the associated remote network and M denotes the designated network addresses.

The VPN tunnels VPN $A^1$-$A^3$, $B^1$-$B^2$, C, between the platform termination points 308-313 in the virtualization platform VP and the access node termination points for the designated network addresses $A^1$-$A^3$, $B^1$-$B^2$, $C^1$-$C^2$ in the access nodes $R_A$, $R_B$, $R_C$ of the remote networks $N_A$, $N_B$, $N_C$, enables a bi-directional communication. For example, the bi-directional communication 11 (dashed) shown in FIG. 2 between the virtualization platform 9 and end users 13 in the remote network $N_A$, $N_B$, $N_C$ through the access nodes $R_A$, $R_B$, $R_C$ of the remote networks $N_A$, $N_B$, $N_C$.

In FIG. 3, the virtualization platform VP also comprises mappings 316-320 between each of the platform termination points 308-312 for the VPN tunnels VPN $A^1$-$A^3$, $B^1$-$B^2$ and each of the virtual operating system instances VPC $A^1$-$A^3$, $B^1$-$B^2$. As the virtual operating system instances VPC $A^1$-$A^3$, $B^1$-$B^2$ have been established or while being set up, the mappings 316-320 may be used to configuring the virtual interfaces of the virtual operating system instances VPC $A^1$-$A^3$, $B^1$-$B^2$, and thus connecting the virtual operating system instances VPC $A^1$-$A^3$, $B^1$-$B^2$ with the platform termination points 308-312. Thus, the network data traffic, i.e. sent and received data packets, generated by operations, commands, instructions or the like, in the virtual operating system instances VPC $A^1$-$A^3$, $B^1$-$B^2$ will be forwarded via the platform termination points 308-312 through the VPN tunnels VPN $A^1$-$A^3$, $B^1$-$B^2$, respectively.

The network data traffic to IP addresses in the remote networks $N_A$, $N_B$ or other networks, such as, the Internet, generated by operations, commands, instructions or the like, in the virtual operating system instances VPC $A^1$-$A^3$, $B^1$-$B^2$ may in this manner always first be routed to the access node termination points in the access nodes $R_A$, $R_B$ of the remote networks $N_A$, $N_B$. From the access node termination points, said network data traffic may be forwarded to its receiving IP address. The network data traffic will comprise the IP addresses of the designated network addresses $A^1$-$A^3$, $B^1$-$B^2$ as the originating IP address of the network data traffic. Thus, said network data traffic will appear to the receiver as to be originating from the IP addresses of the designated network addresses $A^1$-$A^3$, $B^1$-$B^2$ belonging to the IP address domain space of the remote networks $N_A$, $N_B$. This is indicated by the dashed arrows in FIG. 3.

For the shared VPN tunnel VPN C, the virtualization platform VP may further comprise a switch SW, such as, e.g. a virtual switch. The switch SW may be arranged to bi-directionally forward network traffic between the platform termination point 313 for the VPN tunnel VPN C and the virtual operating system instances VPC $C^1$-$C^2$. The switch SW may further comprise mappings 321-322 to each of the virtual operating system instances VPC $C^1$-$C^2$. As the virtual operating system instances VPC $C^1$-$C^2$ have been established or while being set up, the mappings 321-322 may be used to configure the virtual interfaces of the virtual operating system instances VPC $C^1$-$C^2$, and thus connecting the virtual operating system instances VPC $C^1$-$C^2$ with the platform termination point 313. Thus, the network data traffic generated by operations, commands, instructions or the like, in the virtual operating system instances VPC $C^1$-$C^2$ will be forwarded via the platform termination point 313 through the VPN tunnel VPN C.

As the access node $R_C$ comprises the access node termination point of the remote network $N_C$, network data traffic to IP addresses in the remote networks $N_A$, $N_B$ or other networks, such as, the Internet, generated by operations, commands, instructions or the like, in the virtual operating system instances VPC $C^1$-$C^2$ may always first be routed to the access node termination point in the access node $R_C$. From the access node $R_C$ the network data traffic may be forwarded to its receiving IP address. The network data traffic will comprise the IP addresses of the designated network addresses $C^1$-$C^2$ as the originating IP address of the network data traffic. Thus, said network data traffic will appear to the receiver as to be originating from the IP address of the designated network addresses $C^1$-$C^2$ belonging to the IP address domain space of the remote network $N_C$. This is indicated by the dashed arrow in FIG. 3.

In FIG. 4 shows a detailed block diagram of a virtualization platform VP according to an exemplary embodiment of the invention.

The virtualization platform VP may comprise one or several physical network interfaces P_NICs. The physical network interfaces P_NICs may be used by the virtualization platform VP in order to communicate with a providing network, e.g. the providing network $N_P$ in FIG. 3. Each of the virtual operating system instances VPCs comprises virtual network interfaces V_NICs. The virtual network interfaces V_NICs may be used by the VPCs in order to communicate with the virtualization platform VP.

Using the physical network interfaces P_NICs, the virtualization platform VP may be arranged to establish VPN tunnel interfaces N_NICs. The VPN tunnel interfaces N_NICs may be used as the platform termination points 308-314 for the VPN tunnels VPN $A^1$-$A^3$, $B^1$-$B^2$, C, ..., $N^M$ referred to above in reference to FIG. 3. Accordingly, the virtualization platform VP may be arranged to map each of the virtual network interfaces V_NICs of the virtual operating system instances VPCs to each of the VPN tunnel interfaces N_NICs, respectively. Therefore, any network data traffic sent on a virtual network interface V_NIC by the virtual operating system instances VPCs will be forwarded via some VPN tunnel interface N_NIC, and analogously in the other direction.

As the virtual operating system instances VPCs are created or started, the mappings may be used to configure the virtual network interfaces V_NICs of the virtual operating system instances VPCs, and thus connect the virtual operating system instances VPCs with the VPN tunnel interfaces N_NICs. The virtual network interfaces V_NICs may be configured using, for example, the Dynamic Host Configuration Protocol (DHCP) or static configuration.

The virtualization platform VP may according to a further exemplary embodiment be arranged to re-use the IP address of the remote network for the mapping between the VPN tunnel interfaces N_NICs and the virtual network interfaces V_NICs of the virtual operating system instances VPCs. Preferably, this may be performed for the cases where there is a one-to-one mapping the VPN tunnel interfaces N_NICs and the virtual network interfaces V_NICs of the virtual operating system instances VPCs. An example of such a one-to-one mapping is the mapping between the virtual network interfaces of the virtual operating system instances VPC $A^1$-$A^3$, $B^1$-$B^2$ and the platform termination points 308-312 in FIG. 3. This could be used in order to directly connect a VPN tunnel to a given virtual operating system interface VPC when, for example, having a client database which comprises IP-addresses of the remote networks belonging to the clients.

FIG. 5 is a flowchart illustrating a method for virtualization according to an exemplary embodiment of the invention.

In step S51, the virtualization platform may establish a virtual private network (VPN) tunnel between the virtualization platform and a remote network. The VPN tunnel may be anchored at a first termination point in the virtualization platform and at a second termination point in the remote network. It should, however, be noted that step S51 may also be performed after step S52.

In step S52, the virtualization platform may map virtual operating system instances VPCs to said VPN tunnel. The mapping may be made in between virtual network interfaces in the VPCs and the first termination point in the virtualization platform. The mapping allows created virtual operating system instances VPCs to be configured from a remote network. This will cause the virtual operating system instances VPCs to send and receive network data traffic to/from the virtual operating system instances VPCs, via said first termination point through said VPN tunnel to the second termination point in the remote network before said network data traffic is sent to its recipient. The network data traffic may thus be arranged with an originating IP address belonging to the IP address domain space of the remote network.

FIG. 6 is a flowchart illustrating more detailed method for virtualization according to an exemplary embodiment of the invention.

In step S61, the virtualization platform VP may establish a virtual private network (VPN) tunnel between a VPN network interface N_NIC in the virtualization platform VP and said address node termination point in the remote network. The VPN network interfaces N_NICs, also referred to as platform termination points, may be set up upon the establishment of the VPN tunnel. It should, however, be noted that step S61 may also be performed after step S62.

In step S62, the virtualization platform VP may map a virtual network interface V_NIC of a virtual operating system instance VPC to said VPN network interface N_NIC in the virtualization platform. If the VPN tunnel is established for more than one designated network address in the remote network, the virtualization platform VP may map several virtual network interfaces V_NICs of the virtual operating system instances VPCs to a switch SW. The switch SW may be arranged to intermediately communicate with said several virtual network interfaces V_NICs of the virtual operating system instances VPCs and said VPN network interface in the virtualization platform VP.

By using said mapping of the virtual network interface V_NIC in the virtualization platform VP, the virtual operating system instance VPC may be configured from a remote network. This may be performed in the remote network by using, for example, DHCP for distributing IP-adresses. This provides advantages for both the owner of the providing network and the owner of the remote network. In this way, the owner of the providing network does not have to configure the virtual operating system instances for the remote network, and the owner of the remote network can configure the network addresses of the leased virtual operating system instances VPCs according to what his own desired network address structure.

Thus, the virtual operating system instance VPC may send and receive network data traffic to/from the virtual operating system instances VPC, via said VPN network interface through said VPN tunnel and onto the access node termination point in the remote network before said network data traffic is sent to its recipient. The network data traffic may thus be arranged with an originating IP address belonging to the IP address domain space of the remote network.

It should be noted that the methods described above may be used when configuring a virtual machine for a remote network for the first time.

The virtual machines provided by a virtualization platform according to the invention make it possible for an end user or multiple end users with access to access nodes in a remote network to execute operations, commands and instructions on the virtual machine over a packet based communication network, such as, the Internet, without appearing to other entities in the remote network, or any other networks, as being performed anywhere else than at a location in the remote network.

The virtual machines provided by a virtualization platform according to the invention also make it possible for an owner of the remote network to perform a system migration of network hosts in the remote network into virtual machines in a virtualization platform located in a providing network, without having to reconfigure the network address structure of the remote network. The network host may, for example, be a mail server or a content servers containing important information which the owner wishes to place at another location, but still wants to be a part of the internal network.

In general it should be noted that other benefits with virtualization it that it has a number of advantages over implementing and running operating systems on physical machines, such as, local computer hardware. For example, it allows owners of remote networks to minimize the amount of computer hardware used by the remote network. This enables otherwise occupied spaces to be cleared and also reduces the power consumption at the end user location. Another advantage is that a virtual machine may be accessible at anytime and from anywhere in the remote network or any other network with access to the access node of the remote network.

Furthermore, operating systems running on physical machines are often not fully utilized by the end users of the remote network, and therefore the physical machines are often not ever used to their full extent. This generates unnecessary costs in the purchase of computer equipment for the home or the office. It also leads to additional costs for the maintenance of the computer equipment. The remote network may also share a physical server. The costs for the occupied space, the purchase and the maintenance of the physical server may also be expensive, for example, to small businesses with few end users. It may also lead to difficulties as companies grows and expands their businesses.

The description above is of the best mode presently contemplated for practising the invention. The description is not intended to be taken in a limiting sense, but is made merely for the purpose of describing the general principles of the invention. The scope of the invention should only be ascertained with reference to the issued claims.

The invention claimed is:

1. A virtualization platform (VP) arranged to provide a plurality of virtual operating system instances (VPC $A^1$-$A^3$; $B^1$-$B^2$; $C^1$-$C^2$; ...; $N^M$) to a plurality of remote networks ($N_A$; $N_B$; $N_C$) over a packet-based communication network (5), said virtualization platform (VP) comprises a plurality of first termination points (308-314) which enable establishment of a plurality of virtual private network [VPN] tunnels (VPN $A^1$-$A^3$; $B^1$-$B^2$; $C^1$-$C^2$; ...; $N^M$) between said plurality of first termination points (308-314) and a plurality of second termination points in said plurality of remote networks ($N_A$; $N_B$; $N_C$) over said packet-based communication network (5), wherein said virtualization platform (VP) is arranged to map (316-322) a plurality of virtual network interfaces (V_NICs) of said plurality of virtual operating system instances (VPC $A^1$-$A^3$; $B^1$-$B^2$; $C^1$-$C^2$; ...; $N^M$) to said plurality of first termination points (308-314) of said plurality of VPN tunnels (VPN $A^1$-$A^3$; $B^1$-$B^2$; $C^1$-$C^2$; ...; $N^M$), said plurality of first termination points (308-314) being a plurality of VPN tunnel interfaces (N_NICs) of at least one physical networks interface (P_NIC), such that any data network traffic to and from said plurality of virtual operating system instances (VPC $A^1$-$A^3$; $B^1$-$B^2$; $C^1$-$C^2$; ...; $N^M$) is forwarded through said plurality of first termination points (308-314) and such that any data network traffic generated by operations, commands, or instructions in the plurality of virtual operating system instances (VPC $A^1$-$A^3$; $B^1$-$B^2$; $C^1$-$C^2$; ...; $N^M$) comprises IP addresses of the plurality of remote networks ($N_A$; $N_B$; $N_C$).

2. A virtualization platform (VP) according to claim 1, further arranged to:

establish said plurality of VPN tunnels (VPN $A^1$-$A^3$; $B^1$-$B^2$; $C^1$-$C^2$; ...; $N^M$) between said plurality of first termination points (308-314) in the virtualization platform (VP), and said plurality of second termination points in said plurality of remote networks ($N_A$; $N_B$; $N_C$).

3. A virtualization platform (VP) according to claim 1, wherein said virtualization platform (VP) uses network addresses of said plurality of remote networks ($N_A$; $N_B$; $N_C$) for the mapping (316-322) towards said plurality of virtual operating system instances (VPC $A^1$-$A^3$; $B^1$-$B^2$; $C^1$-$C^2$; ...; $N^M$), if there is a one-to-one mapping (316-320) between said plurality of virtual operating system instances (VPC $A^1$-$A^3$; $B^1$-$B^2$; $C^1$-$C^2$; ...; $N^M$) and said plurality of first termination points (308-314).

4. A virtualization platform (VP) according to claims 1, comprising a switch (SW) arranged to:

receive network traffic for at least two virtual operating system instances (VPC $C^1$-$C^2$); and forward said network traffic to and from said first termination point (313) of the VPN tunnel (VPN C) from and to said at least two virtual operating system instances (VPC $C^1$-$C^2$) when said at least two virtual operating system instances (VPC $C^1$-$C^2$) are in operation.

5. A virtualization platform (VP) according to claims 1, wherein said plurality of second termination points are located at a shared access node ($R_A$; $R_B$; $R_C$) in said plurality of remote networks ($N_A$; $N_B$; $N_C$).

6. A virtualization platform (VP) according to claims 1, wherein said plurality of virtual operating system instances (VPC $A^1$-$A^3$; $B^1$-$B^2$; $C^1$-$C^2$; . . . ; $N^M$) are arranged to be configured from said plurality of remote networks ($N_A$; $N_B$; $N_C$).

7. A virtualization platform (VP) according to claim 6, wherein, if said one of said plurality of virtual operating system instances (VPC $A^1$-$A^3$; $B^1$-$B^2$; $C^1$-$C^2$; . . . ; $N^M$) comprises DHCP client, said configuration is performed by a DHCP server located in one of said plurality of remote networks ($N_A$; $N_B$; $N_C$).

8. A method for use in a virtualization platform (VP) arranged to provided a plurality of virtual operating system instances (VPC $A^1$-$A^3$; $B^1$-$B^2$; $C^1$-$C^2$; . . . ; $N^M$) to a plurality of remote networks ($N_A$; $N_B$; $N_C$) over a packet-based communication network (5), the virtualization platform (VP) comprising a plurality of first termination points (308-314) which enable establishment of a plurality of VPN tunnels (VPN $A^1$-$A^3$; $B^1$-$B^2$; $C^1$-$C^2$; . . . ; $N^M$) between said plurality of first termination points (308-314) and a plurality of second termination points in said plurality of remote networks ($N_A$; $N_B$; $N_C$) over said packet-based communication network (5), comprising:

mapping (316-322) a plurality of virtual network interfaces (V_NICs) of said plurality of virtual operating system instances (VPC $A^1$-$A^3$; $B^1$-$B^2$; $C^1$-$C^2$; . . . ; $N^M$) to the plurality of first termination points (308-314) of said plurality of VPN tunnels (VPN $A^1$-$A^3$; $B^1$-$B^2$; $C^1$-$C^2$; . . . ; $N^M$), the plurality of first termination points (308-314) being a plurality of VPN tunnel interfaces (N_NICs) of at least one physical network interface (P_NIC), such that any data network traffic to and from said plurality of virtual operating system instances (VPC $A^1$-$A^3$; $B^1$-$B^2$; $C^1$-$C^2$; . . . ; $N^M$) is forwarded through said plurality of first termination point (308-314) and such that any data network traffic generated by operations, commands, or instructions in the plurality of virtual operating system instances (VPC $A^1$-$A^3$; $B^1$-$B^2$; $C^1$-$C^2$; . . . ; $N^M$) comprises IP addresses of the plurality of remote networks ($N_A$; $N_B$; $N_C$).

9. A method according to claim 8, further comprising the step of:

establishing said plurality of VPN tunnels (VPN $A^1$-$A^3$; $B^1$-$B^2$; $C^1$-$C^2$; . . . ; $N^M$) between said plurality of first termination points (308-314) in the virtualiztion platform (VP), and said plurality of second termination points in said at least on remote network ($N_A$; $N_B$; $N_C$).

10. A computer program product for use in a virtualization platform (VP) which comprises computer readable codes means, which when run in the virtualization platform (VP) causes said virtualization platform (VP) to perform the step of:

mapping (316-322) a plurality of virtual network interfaces (V_NICs) of a plurality of virtual operating system instances (VPC $A^1$-$A^3$; $B^1$-$B^2$; $C^1$-$C^2$; . . . ; $N^M$) to a plurality of first termination points (308-314) of a plurality of VPN tunnels (VPN $A^1$-$A^3$; $B^1$-$B^2$; $C^1$-$C^2$; . . . ; $N^M$), the plurality of first termination points (308-314) being a plurality of VPN tunnel interfaces (N-NICs) of at least one physical network (P_), such that any data network traffic to and from said plurality of virtual operating system instances (VPC $A^1$-$A^3$; $B^1$-$B^2$; $C^1$-$C^2$; . . . ; $N^M$) is forwarded through said plurality of first termination points (308-314) and such that any data network traffic generated by operations, commands, or instructions in the plurality of virtual operating system instances (VPC $A^1$-$A^3$; $B^1$-$B^2$; $C^1$-$C^2$; . . . ; $N^M$) comprises IP addresses of a plurality of remote networks ($N_A$; $N_B$; $N_C$), wherein said code means is stored on a non-transitory readable storage medium.

11. A computer program product according claim 10, comprising computer readable code means, which when run in the virtualization platform (VP) causes the virtualization platform(VP) to further perform the step of:

establishing one VPN tunnel (VPN $A^1$-$A^3$; $B^1$-$B^2$; $C^1$-$C^2$; . . . ; $N^M$) between said at least one first termination point (308-314) in the virtualization platform (VP), and at least one second termination point in said at least one remote network ($N_A$; $N_B$; $N_C$).

* * * * *

UNITED STATES PATENT AND TRADEMARK OFFICE
CERTIFICATE OF CORRECTION

| | | |
|---|---|---|
| PATENT NO. | : 9,264,403 B2 | Page 1 of 1 |
| APPLICATION NO. | : 13/122755 | |
| DATED | : February 16, 2016 | |
| INVENTOR(S) | : Flinta et al. | |

It is certified that error appears in the above-identified patent and that said Letters Patent is hereby corrected as shown below:

In the Specification

In Column 10, Line 66, in Claim 4, delete "claims" and insert -- claim --, therefor.

In Column 11, Line 8, in Claim 5, delete "claims" and insert -- claim --, therefor.

In Column 11, Line 12, in Claim 6, delete "claims" and insert -- claim --, therefor.

In Column 11, Line 24, in Claim 8, delete "provided" and insert -- provide --, therefor.

In Column 12, Line 10, in Claim 9, delete "virtualiztion" and insert -- virtualization --, therefor.

In Column 12, Line 24, in Claim 10, delete "(N-NICs)" and insert -- (N_NICs) --, therefor.

Signed and Sealed this
Fourteenth Day of June, 2016

Michelle K. Lee
*Director of the United States Patent and Trademark Office*